US009550239B2

(12) United States Patent
Yamamoto

(10) Patent No.: US 9,550,239 B2
(45) Date of Patent: Jan. 24, 2017

(54) CUTTING INSERT, CUTTING TOOL, AND METHOD OF PRODUCING MACHINED PRODUCT

(71) Applicant: KYOCERA Corporation, Kyoto-shi, Kyoto (JP)

(72) Inventor: Masahiro Yamamoto, Moriyama (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 241 days.

(21) Appl. No.: 14/401,949

(22) PCT Filed: May 29, 2013

(86) PCT No.: PCT/JP2013/064871
§ 371 (c)(1),
(2) Date: Nov. 18, 2014

(87) PCT Pub. No.: WO2013/180161
PCT Pub. Date: Dec. 5, 2013

(65) Prior Publication Data
US 2015/0165532 A1    Jun. 18, 2015

(30) Foreign Application Priority Data

| May 30, 2012 | (JP) | 2012-123192 |
| Jan. 30, 2013 | (JP) | 2013-015094 |

(51) Int. Cl.
*B23C 5/20* (2006.01)
*B23C 5/06* (2006.01)

(52) U.S. Cl.
CPC .......... *B23C 5/202* (2013.01); *B23C 5/06* (2013.01); *B23C 2200/045* (2013.01);
(Continued)

(58) Field of Classification Search
CPC ...... B23C 5/202; B23C 5/06; B23C 2200/045; B23C 2200/125; B23C 2200/128; B23C 2200/203; Y10T 407/23
See application file for complete search history.

(56) References Cited

U.S. PATENT DOCUMENTS

2010/0054873 A1    3/2010 Men et al.
2010/0111619 A1    5/2010 Ballas et al.

FOREIGN PATENT DOCUMENTS

JP    6-21613 Y2    6/1994
JP    10-263916 A    10/1998
(Continued)

OTHER PUBLICATIONS

International Search Report, PCT/JP2013/064871, Jun. 27, 2013, 2 pgs.

*Primary Examiner* — Sunil K Singh
*Assistant Examiner* — Alan Snyder
(74) *Attorney, Agent, or Firm* — Volpe and Koenig, P.C.

(57) ABSTRACT

A cutting insert includes an upper surface, a lower surface, a side surface, and an upper cutting edge. The upper cutting edge includes a major cutting edge having an outwardly projecting curvilinear shape, and a minor cutting edge having a straight line shape and being continuous with the major cutting edge. The side surface includes a continuous inclined surface with the major cutting edge and is inclined outward from the upper surface to the lower surface with respect to a virtual straight line connecting the respective centers of the upper and lower surfaces. An inclination angle of the inclined surface with respect to a virtual straight line on the side surface increases from a portion of the inclined surface which is continuous with an end portion of the major cutting edge to a portion of the inclined surface which is continuous with a center of the major cutting edge.

13 Claims, 15 Drawing Sheets

(52) U.S. Cl.
CPC .. *B23C 2200/125* (2013.01); *B23C 2200/128* (2013.01); *B23C 2200/203* (2013.01); *Y10T 407/2202* (2015.01); *Y10T 407/23* (2015.01)

(56) References Cited

FOREIGN PATENT DOCUMENTS

| JP | 2010-523353 A | 7/2010 |
| JP | 2012-500732 A | 1/2012 |
| WO | 2008/120186 A1 | 10/2008 |
| WO | 2010/023659 A1 | 3/2010 |

# CUTTING INSERT, CUTTING TOOL, AND METHOD OF PRODUCING MACHINED PRODUCT

TECHNICAL FIELD

The present invention relates to a cutting insert, a cutting tool, and a method of producing a machined product.

BACKGROUND ART

Conventionally, a cutting insert as described in Patent document 1 has been well known as a cutting tool for use in a cutting process of a workpiece. The cutting insert described in Patent document 1 is specifically used in a milling process, such as a face milling process or an end milling process. The cutting insert described in Patent document 1 includes an upper cutting edge disposed along an intersection of an upper surface and a side surface, and a lower cutting edge disposed along an intersection of a lower surface and the side surface. The cutting edges are respectively made up of a major cutting edge having a projecting curvilinear shape, and a minor cutting edge that is continuous with the major cutting edge and has a straight line shape in a top plan view.

In the case of including the major cutting edge and the minor cutting edge as described above, the cutting process of the workpiece is performed mainly by the major cutting edge. On this occasion, the minor cutting edge may not be used in the cutting process, but may be used as a flat cutting edge for the purpose of improving a finished surface.

When the cutting process is performed using the cutting insert described in Patent document 1, because the upper cutting edge and the lower cutting edge are included as the cutting edge, an axial rake and a radial rake of a holder are respectively set to negative values in order to avoid interference of the cutting edge on the opposite side during the cutting process. However, the cutting performance of the cutting edges may be deteriorated when the axial rake and the radial rake respectively have the negative values. It is therefore necessary to increase a rake angle. This leads to the problem that the cutting edge strength is lowered and consequently the durability of the cutting insert is lowered.

The present invention has been made in view of the above problem, and an object thereof is to provide a cutting insert having satisfactory durability while ensuring satisfactory cutting performance of the cutting edges, as well as a cutting tool and a method of producing a machined product.

Patent Document 1: Japanese Unexamined Patent Publication No. 2012-500732

SUMMARY OF THE INVENTION

A cutting insert according to an embodiment of the present invention includes a lower surface, an upper surface, a side surface connected to each of the lower surface and the upper surface, and an upper cutting edge located along an intersection of the upper surface and the side surface. The upper cutting edge includes a first major cutting edge having an outwardly projecting curvilinear shape, and a first minor cutting edge that has a straight line shape and is continuous with the first major cutting edge. The side surface includes a first inclined surface that is continuous with the first major cutting edge and is inclined further outward as going from the upper surface to the lower surface with respect to a virtual straight line connecting a center of the upper surface and a center of the lower surface, and a first parallel surface that is continuous with the first minor cutting edge and is parallel to the virtual straight line. In the cutting insert of the present embodiment, an inclination angle of the first inclined surface with respect to the virtual straight line on the side surface increases as going from a portion of the first inclined surface which is continuous with an end portion of the first major cutting edge to a portion of the first inclined surface which is continuous with a center of the first major cutting edge.

PREFERRED EMBODIMENTS FOR CARRYING OUT THE INVENTION

Cutting Insert

Figure 1:
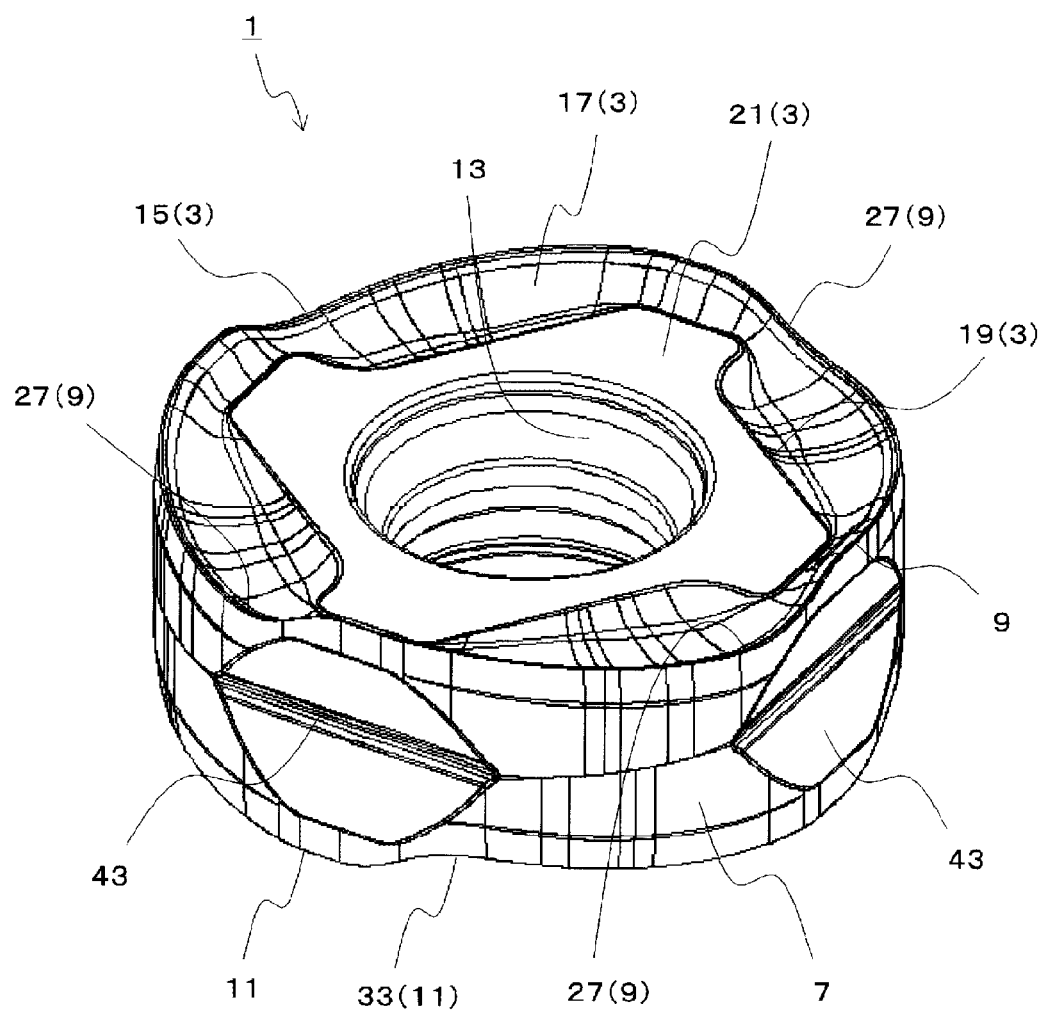
FIG. 1 is a perspective view showing a cutting insert according to an embodiment of the present invention.
Figure 2:
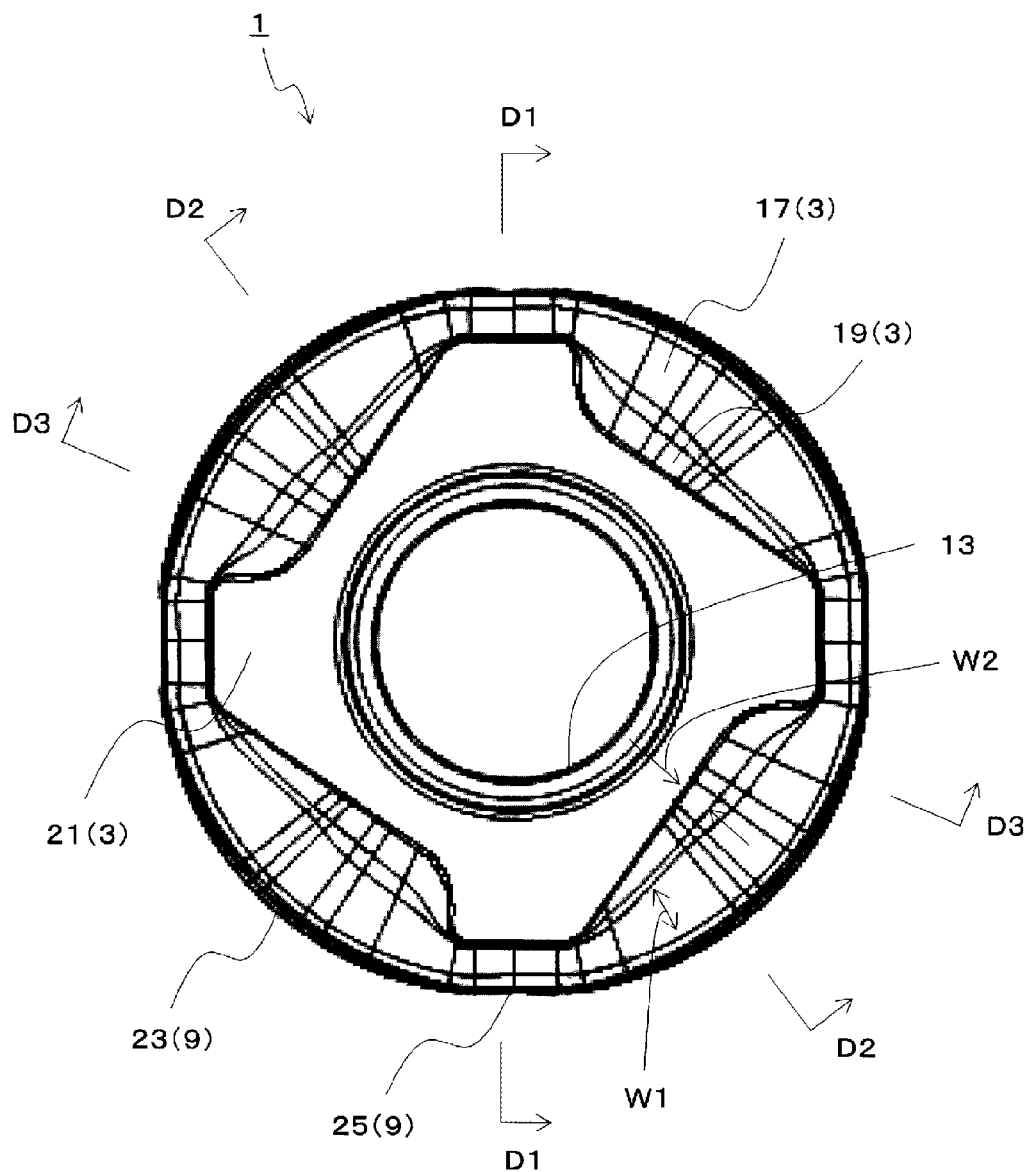
FIG. 2 is a plan view of the cutting insert shown in FIG. 1.
Figure 3:
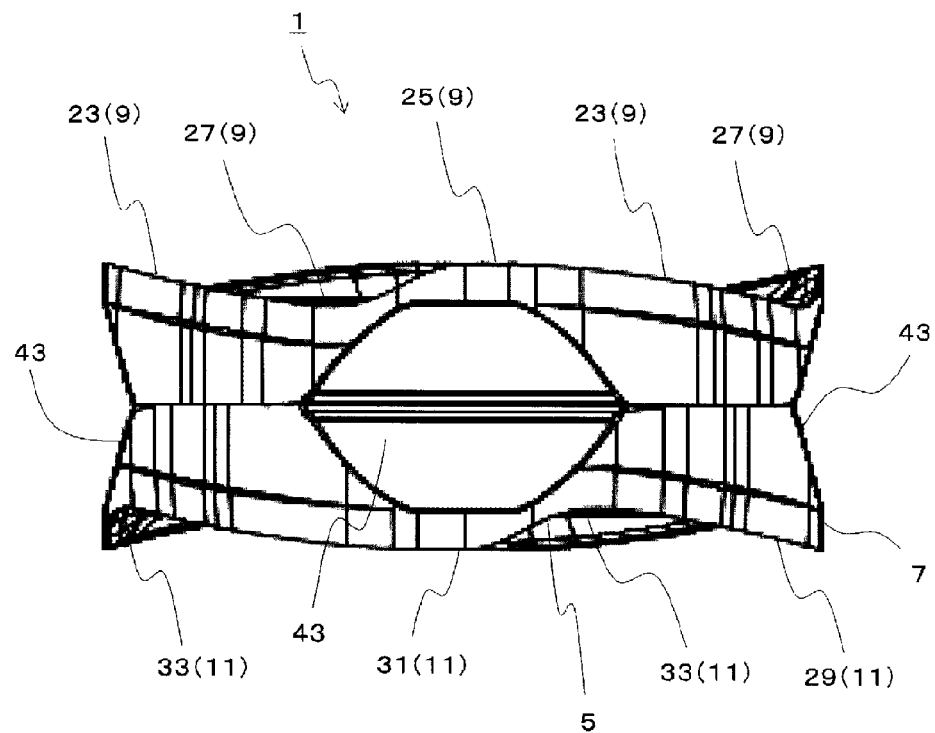
FIG. 3 is a side view of the cutting insert shown in FIG. 1.
Figure 4:
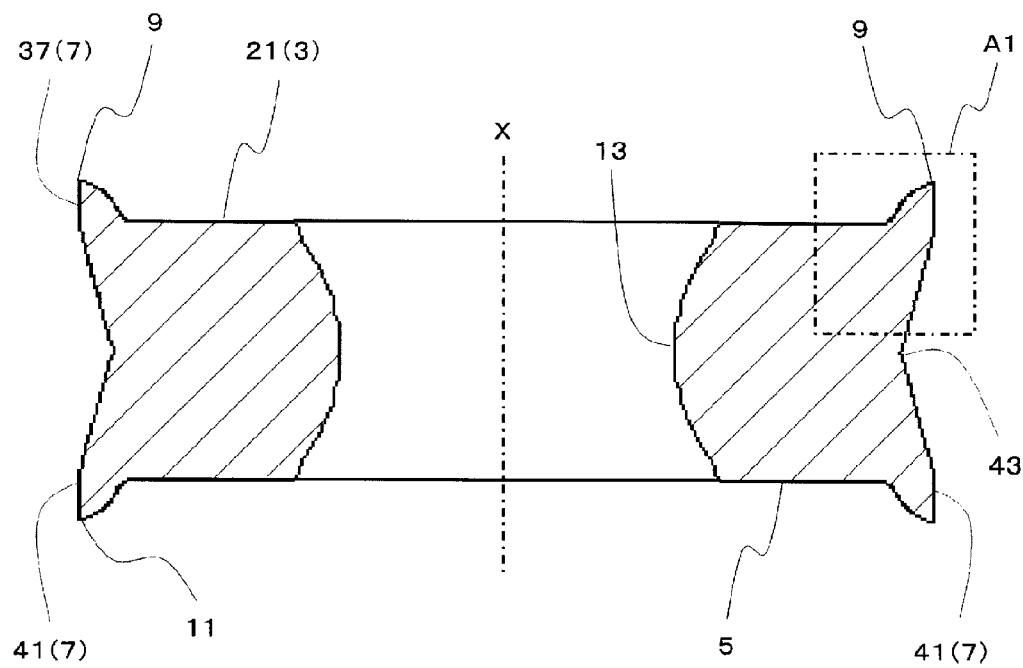
FIG. 4 is a cross-sectional view taken along the line D1-D1 in the cutting insert shown in FIG. 2.
Figure 5:
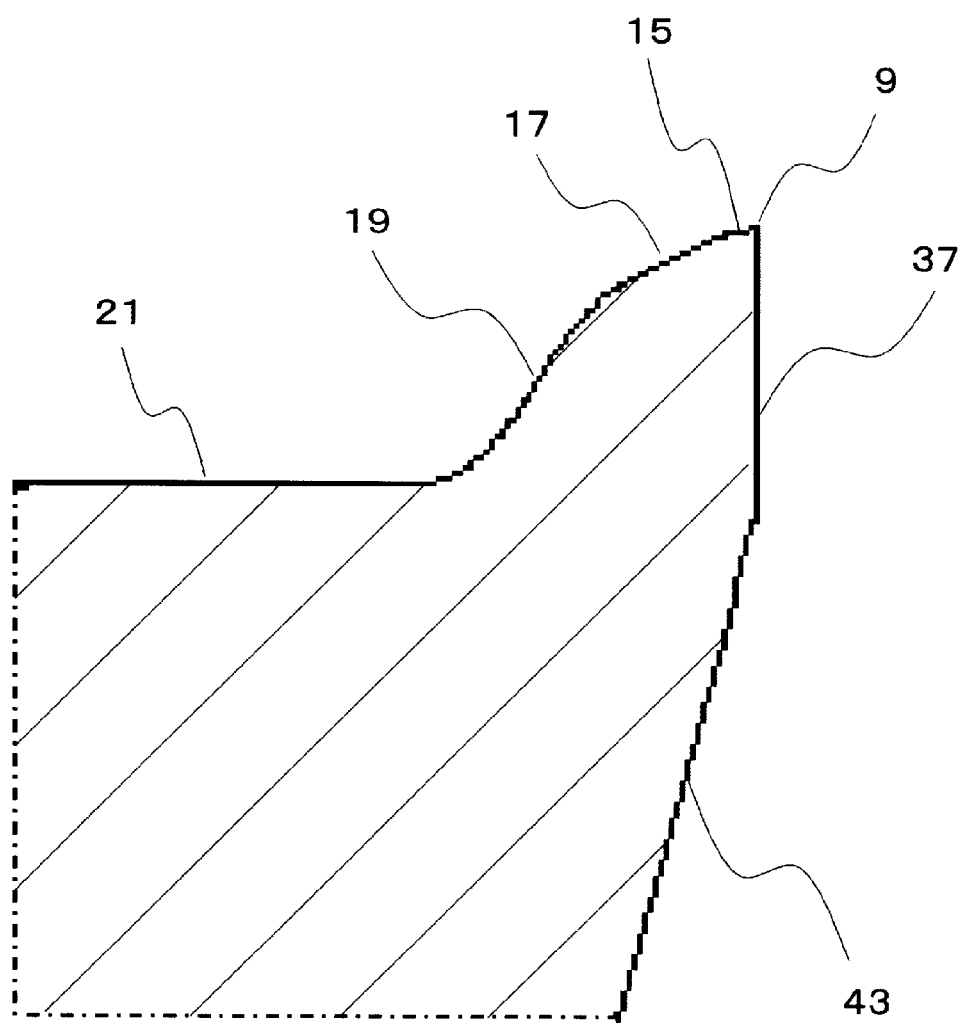
FIG. 5 is an enlarged cross-sectional view showing in enlarged dimension a region A1 in the cutting insert shown in FIG. 4.

A cutting insert according to an embodiment of the present invention is described in detail below with reference to the drawings. For the sake of convenience, the individual drawings to be referred to in the following show in a simplified manner only main members needed for describing the present invention among structural members of the present embodiment. Hence, the cutting insert according to the present invention may include an optional structural member not shown in the individual drawings referred to in the present description. The dimensions of members in each of the drawings are not ones which faithfully plot the actual dimensions of the structural members and the dimensional ratios of the structural members.

As shown in FIGS. 1 to 9, the cutting insert 1 of the present embodiment includes an upper surface 3, a lower surface 5, and a side surface 7. The side surface 7 is connected to each of the upper surface 3 and the lower surface 5. An upper cutting edge 9 is disposed along an intersection of the upper surface 3 and the side surface 7. A lower cutting edge 11 is disposed along an intersection of the lower surface 5 and the side surface 7. The upper surface 3 and the lower surface 5 respectively have approximately circular shapes and have approximately the same shape in a top plan view. Specifically, an outer periphery of the upper surface 3 has four circular-arc shaped curvilinear portions. These four curvilinear portions are respectively connected to one another by a portion that has a straight line shape in the top plan view.

Examples of the material of the cutting insert 1 include cemented carbide and cermet. Examples of the composition of cemented carbide include WC—Co produced by adding cobalt (Co) powder to tungsten carbide (WC), followed by sintering, WC—TiC—Co produced by adding titanium carbide (TiC) to WC—Co, and WC—TiC—TaC—Co produced by adding tantalum carbide (TaC) to WC—TiC—Co. Cermet is a sintered composite material obtained by compositing metal with a ceramic ingredient, and specific examples thereof include titanium compounds composed mainly of titanium carbide (TiC) or titanium nitride (TiN).

The surface of the cutting insert 1 may be coated with a coating by using a chemical vapor deposition (CVD) method or a physical vapor deposition (PVD) method. Examples of the composition of the coating includes titanium carbide (TiC), titanium nitride (TiN), titanium carbonitride (TiCN), and alumina ($Al_2O_3$).

A maximum width of each of the upper surface 3 and the lower surface 5 is 5 to 20 mm in the cutting insert 1 of the present embodiment. A height of the upper surface 3 from the lower surface 5 is 2 to 8 mm. Here, the height of the upper surface 3 from the lower surface 5 denotes a width in a direction parallel to a virtual straight line X connecting the center of the upper surface 3 and the center of the lower surface 5 in space between an upper end of the upper surface 3 and a lower end of the lower surface 5. The virtual straight line X connects the center of the upper surface 3 and the center of the lower surface 5 and hence is also a central axis of the cutting insert 1.

The shapes of the upper surface 3 and the lower surface 5 are not limited to that described above. For example, the shape of the upper surface 3 in a top plan view may be a polygonal shape, such as a triangular shape, a square shape, a pentagonal shape, a hexagonal shape, or an octagonal shape. Even when the upper surface 3 has the curvilinear portions, the shape of the curvilinear portions is not limited to the circular arc shape. The curvilinear portions may have an outwardly projecting curvilinear shape, such as a parabola or elliptic curve.

A through hole 13 is disposed so as to extend between the center of the upper surface 3 and the center of the lower surface 5. Accordingly, the extending direction of the through hole 13 is parallel to the virtual straight line X. The through hole 13 is disposed to permit insertion of a screw 105 into the through hole 13 when the cutting insert 1 is screwed to a holder 103 of a cutting tool 101. As a method of fixing the cutting insert 1 to the holder 103, a clamp structure may be employed instead of the foregoing screwing manner.

The upper surface 3 includes a land surface 15, a rake surface 17, a breaker surface 19, and a major surface 21. The land surface 15 is located on the outer periphery of the upper surface 3 so as to be connected to the upper cutting edge 9. The rake surface 17 is located closer to the center than the land surface 15. The rake surface 17 is also an inclined surface whose height decreases as going to the center. The breaker surface 19 is located closer to the center than the rake surface 17. The breaker surface 19 has a concave shape made up of an inclined surface portion whose height decreases as going to the center, and a portion that is located closer to the center and has a larger height than the inclined surface. The major surface 21 is located closer to the center than the breaker surface 19. The major surface 21 is a flat surface perpendicular to the virtual straight line X.

The land surface 15 is formed in an inclined surface approximately parallel to the lower surface 5, or in an inclined surface whose height decreases as going to the center. The term "approximately parallel" does not denote being strictly parallel but denotes an allowance of a slight inclination of approximately ±5°. When the lower surface 5 is not flat and hence it is difficult to determine whether the land surface 15 is parallel to the lower surface 5, the land surface 15 needs to be compared with the virtual straight line X instead of the lower surface 5. That is the land surface 15 needs to be evaluated based on whether it is perpendicular to the virtual straight line X.

The upper cutting edge 9 is disposed along an intersection of the land surface 15 and the side surface 7. The land surface 15 is disposed for the purpose of enhancing the strength of the upper cutting edge 9. In the case of not including the land surface 15, the upper cutting edge 9 is to be disposed along an intersection of the rake surface 17 and the side surface 7. The rake surface 17 located inward of the land surface 15 is an inclined surface whose height decreases as going to the center as described above. Accordingly, an interior angle formed by the rake surface 17 and the side surface 7 is small. On the other hand, an interior angle formed by the land surface 15 and the side surface 7 is larger than the interior angle formed by the rake surface 17 and the side surface 7. Therefore, the strength of the upper cutting edge 9 can be enhanced by including the land surface 15.

When aimed at enhancement of the cutting performance of the upper cutting edge 9, the upper cutting edge 9 may be disposed along the intersection of the rake surface 17 and the side surface 7. This configuration ensures that the upper cutting edge 9 has a sharp shape. A width of the land surface 15 is indicated by a distance between the outer periphery of the upper surface 3 and an outer periphery of the rake surface 17. The width of the land surface 15 is suitably set in a range of, for example, 0.05 to 0.2 mm according to cutting conditions.

The rake surface 17 is located inward of the land surface 15. The rake surface 17 has a role in scooping up chips to be generated by the upper cutting edge 9. Consequently, the chips of the workpiece 201 flow along the surface of the rake surface 17. The rake surface 17 is an inclined surface whose height decreases as going to the center so as to satisfactorily scoop up the chips. An inclination angle indicated by an angle formed by the lower surface 5 and the rake surface 17 in a cross section perpendicular to the rake surface 17 needs to be set in a range of, for example, 10° to 50°. The rake surface 17 needs to have a smaller height as going to the center. Therefore, as shown in FIGS. 4 to 9, the rake surface 17 may be made up of a plurality of regions having different inclination angles in a cross-sectional view. Alternatively, the rake surface 17 may have a concave curvilinear shape.

The breaker surface 19 is located inward of the rake surface 17. The breaker surface 19 has a role in spirally curling the chips after flowing along the surface of the rake surface 17. The spirally deformed chips contributes to excellent chip discharge performance of the cutting insert 1. For that purpose, the height of a region of the breaker surface 19 located close to the major surface 21 increases as going away from the outer periphery of the breaker surface 19. Specifically, the breaker surface 19 is an inclined surface whose height at the center is larger than that at the outer periphery thereof on the upper surface 3. An inclination angle indicated by an angle formed by the lower surface 5 and the inclined surface of the breaker surface 19 in a cross section perpendicular to the breaker surface 19 may be set in a range of, for example, 5° to 45°.

The upper cutting edge 9 is disposed along the intersection of the upper surface 3 and the side surface 7. The upper cutting edge 9 includes a first major cutting edge 23 having an outwardly projecting curvilinear shape, and a first minor cutting edge 25 having a straight line shape. The cutting insert 1 of the present embodiment includes four circular arc shaped portions as the first major cutting edge 23. The first minor cutting edges 25 are respectively located between the four first major cutting edges 23. That is, the four first major cutting edges 23 are respectively connected to one another by the four first minor cutting edges 25. Each of the first major cutting edges 23 is configured to be longer than each of the first minor cutting edges 25.

Although the cutting insert 1 of the present embodiment includes the four first major cutting edges 23 and the four first minor cutting edges 25, the number of each of the first major cutting edges 23 and the number of the first minor cutting edges 25 may be for example, two, three, five, or six without limitation to four.

Figure 10:
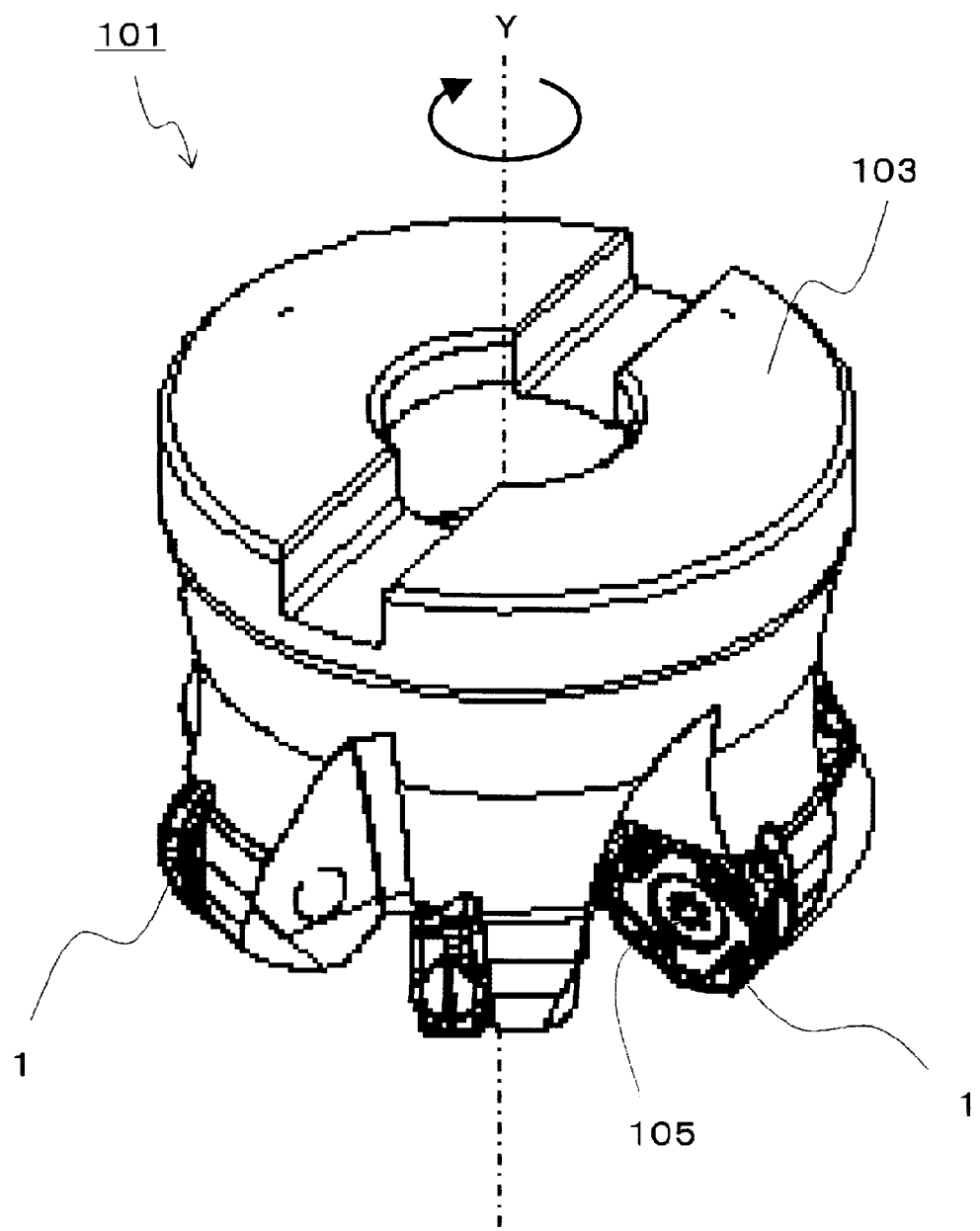
FIG. 10 is a perspective view showing a cutting tool according to an embodiment of the present invention.

In the cutting tool 101 shown in FIG. 10, using the cutting insert 1 of the present embodiment, one of the four first major cutting edges 23 is used as the major cutting edge in the cutting process of the workpiece 201. On this occasion, the first minor cutting edge 25 adjacent to the first major cutting edge 23 used in the cutting process is used as a "flat cutting edge" in the cutting process. The first minor cutting edge 25 used as the flat cutting edge is disposed on the holder 103 so as to be parallel to the upper surface 3 of the workpiece 201.

Here, the intersection of the upper surface 3 and the side surface 7 is not a strict line shape to be formed by the intersection of these two surfaces. When the intersection of the upper surface 3 and the side surface 7 is sharpened at an acute angle, the durability of the upper cutting edge 9 is lowered. Therefore, a portion along which the upper surface 3 and the side surface 7 intersect each other may have a slight curved surface shape after being subjected to a so-called honing process.

The upper cutting edge 9 includes a plurality of first recessed portions 27 recessed toward the lower surface 5. The plurality of first recessed portions 27 are respectively recessed toward the lower surface 5. Therefore, the plurality of first recessed portions 27 have a concave shape that opens upward in a side view. The upper cutting edge 9 including the first recessed portions 27 ensures that a portion of each of the first recessed portions 27 which is inclined with respect to the upper surface 3 is more easily obliquely contacted with the workpiece 201 than the upper cutting edge 9 having the straight line shape parallel to the upper surface 3. This configuration requires less force needed for the cutting, thereby achieving satisfactory machining of the workpiece 201.

The cutting insert 1 of the present embodiment further includes a lower cutting edge 11 disposed along an intersection of the lower surface 5 and the side surface 7, in addition to the upper cutting edge 9 disposed along the intersection of the upper surface 3 and the side surface 7. The lower cutting edge 11 is capable of performing similarly to the upper cutting edge 9 by turning the cutting insert 1 upside down and attaching it to the holder 103. For that purpose, the lower surface 5 has the same configuration as the upper surface 3 in the cutting insert 1 of the present embodiment. Similarly to the upper surface 3, the lower surface 5 includes the land surface 15, the rake surface 17, the breaker surface 19, and the major surface 21.

In order that the lower cutting edge 11 fulfills the same function as the upper cutting edge 9, the lower cutting edge 11 includes a second major cutting edge 29 having an outwardly projecting curvilinear shape, and a second minor cutting edge 31 having a straight line shape. The cutting insert 1 of the present embodiment includes four circular arc shaped portions as the second major cutting edge 29. The second minor cutting edges 31 each having the straight line shape are respectively located between the four second major cutting edges 29. That is the four second major cutting edges 29 are respectively connected to one another by the four second minor cutting edges 31. Each of the second major cutting edges 29 is configured to be longer than each of the second minor cutting edges 31. The lower cutting edge 11 further includes second recessed portions 33 corresponding to the first recessed portions 27 on the upper cutting edge 9. That is, the lower cutting edge 11 includes the plurality of second recessed portions 33 recessed toward the upper surface 3.

The side surface 7 is disposed between the upper surface 3 and the lower surface 5. The side surface 7 is connected to each of the upper surface 3 and the lower surface 5. The side surface 7 includes a first inclined surface 35 and a first parallel surface 37. The first inclined surface 35 is a portion that is connected to the first major cutting edge 23 and is inclined so as to project outward as going from the upper surface 3 to the lower surface 5 with respect to the virtual straight line X connecting the center of the upper surface 3 and the center of the lower surface 5. The first parallel surface 37 is a portion that is connected to the first minor cutting edge 25 and is parallel to the virtual straight line X. The term "outward" denotes a direction to depart from the central axis of the cutting insert 1 when the cutting insert 1 is viewed in a top plan view.

To be specific, the side surface 7 includes a curved surface shaped portion connected to a curvilinear portion on an outer circumferential edge of the upper surface 3, namely, to the first major cutting edge 23, and a planar portion connected to a straight line portion on the outer circumferential edge of the upper surface 3, namely, to the first minor cutting edge 25. The curved surface shaped portion includes a portion being continuous with the upper surface 3, a portion being continuous with the lower surface 5, and a portion located between these two portions. The portion being continuous with the upper surface 3 is the first inclined surface 35 that is inclined outward at an inclination angle θ with respect to the virtual straight line X as going from the upper surface 3 to the lower surface 5. The planar portion is the first parallel surface 37.

Figure 15:
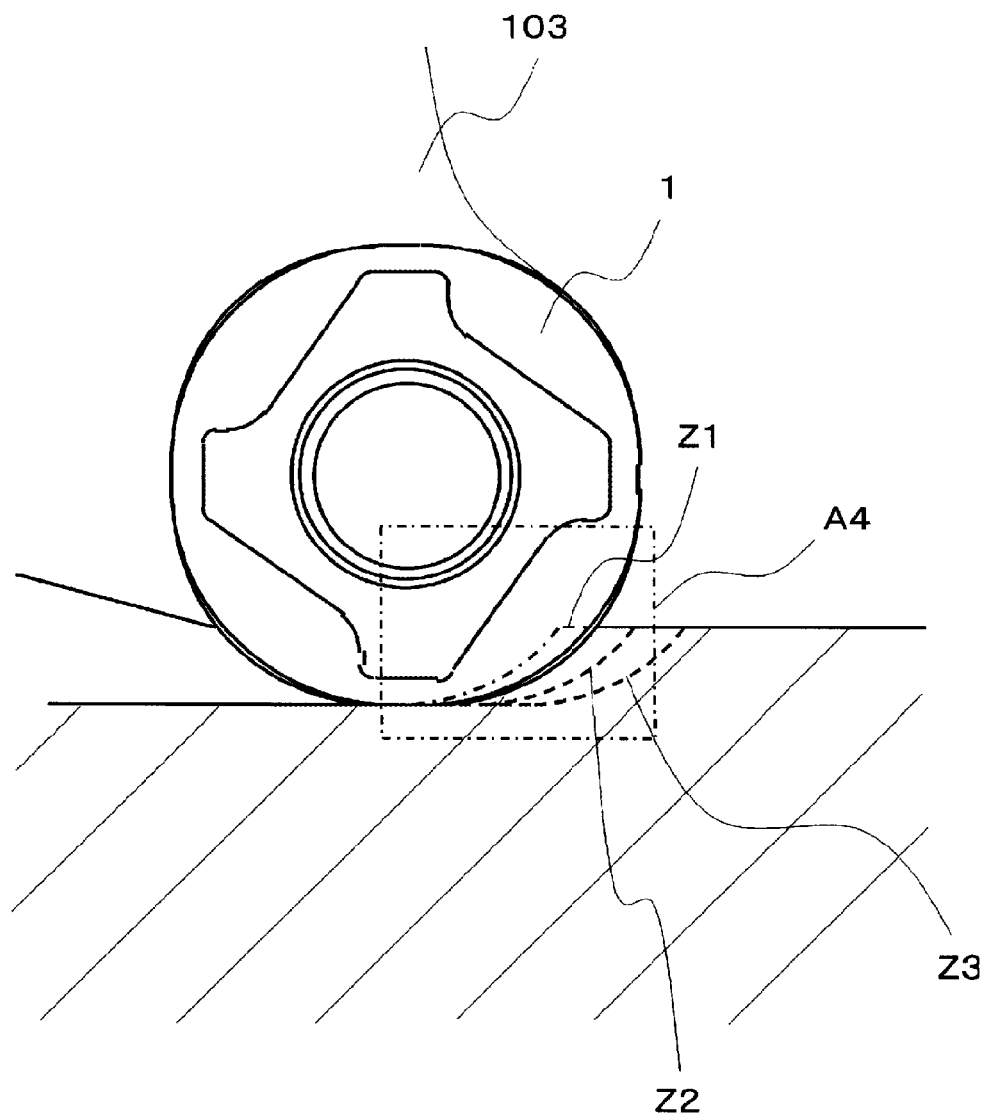
FIG. 15 is a schematic diagram showing a cutting status of the machined product (workpiece)
Figure 16:
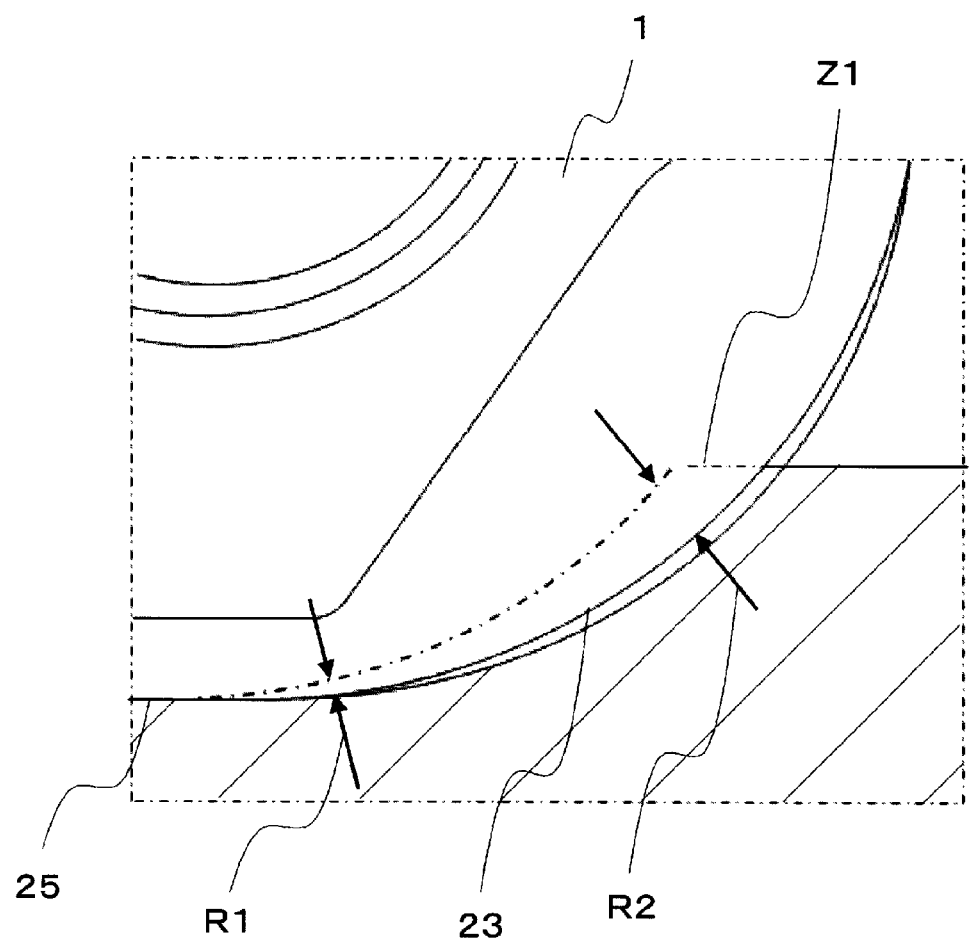
FIG. 16 is a schematic diagram showing in enlarged dimension a region A4 in FIG. 15.

When the cutting process is performed using the cutting insert 1 including the projecting curvilinear shaped first major cutting edge 23 and the straight line shaped first minor cutting edge 25, a larger cutting resistance is applied from the workpiece 201 to the first major cutting edge 23 than the first minor cutting edge 25 as the flat cutting edge. Additionally, the first major cutting edge 23 having the projecting curvilinear shape ensures a large thickness of the workpiece 201 to be cut by a portion of the first major cutting edge 23 which is spaced apart from the first minor cutting edge 25 as shown in FIGS. 15 and 16. Therefore, this portion is subjected to a relatively large force.

More specifically, when the cutting process is performed using the upper cutting edge 9, a region Z1 is firstly cut. After the region Z1 is cut, or at the same time that the region Z1 is cut, the cutting tool 101 slides from left to right. Subsequently, a region Z2 is cut by the cutting insert 1. After the region Z2 is cut, or at the same time that the region Z2 is cut, the cutting tool 101 slides from left to right. Subsequently, a region Z3 is cut by the cutting insert 1. Thus, the cutting process by the cutting insert 1 and the slide of the cutting tool 101 including the cutting insert 1 are combined together to perform a face milling process of the workpiece 201.

Here, the first major cutting edge 23 has the projecting curvilinear shape. Accordingly, a thickness R2 of the chips generated at the center of the first major cutting edge 23 is larger than a thickness R1 of the chips generated at an end portion of the first major cutting edge 23 which is close to the first minor cutting edge 25. Consequently, the center of the first major cutting edge 23 is more easily subjected to a large force than the end portion thereof.

In the cutting insert 1 of the present embodiment, the inclination angle θ of the first inclined surface 35 with respect to the virtual straight line X on the side surface 7 increases as going from a portion of the first inclined surface 35 which is continuous with the end portion of the first major cutting edge 23 to a portion of the first inclined surface 35 which is continuous with the center of the first major cutting edge 23. That is, a blade tip located at the center of the first major cutting edge 23 is configured to have a relatively large thickness. Therefore, even when a rake angle is increased to enhance the cutting performance of the cutting edge, it is ensured to enhance the strength of the blade tip located at the portion being continuous with the center of the first major cutting edge 23, which is the portion subjected to the relatively large force. Consequently, it is ensured to provide the cutting insert 1 with the cutting edges having satisfactory cutting performance and satisfactory durability.

In the cutting insert 1 of the present embodiment, the width of the first inclined surface 35 on the side surface 7 in a direction parallel to the virtual straight line X is constant except for the portion of the first inclined surface 35 in which a third recessed portion 43 as a constraining surface is disposed. In the cutting insert 1 of the present embodiment, an inclination angle of the portion of the side surface 7 which is continuous with the first major cutting edge 23 (the first inclined surface 35) with respect to the virtual straight line X is increased as going from the portion being continuous with the end portion of the first major cutting edge 23 to the portion being continuous with the center of the first major cutting edge 23. This configuration ensures optimization of the strength of the upper cutting edge 9 at individual cut positions.

Here, the strength of the upper cutting edge 9 is lowered when the width of the first inclined surface 35 in the direction parallel to the virtual straight line X is small. Particularly, when the first inclined surface 35 partially includes a small-width portion, a large load may be applied to the small-width portion. On the other hand, the constant width in the direction parallel to the virtual straight line X contributes to reducing variations in the strength of the upper cutting edge 9, thereby further enhancing the strength of the upper cutting edge 9 as a whole.

A lower end of the first inclined surface 35 on the side surface 7 is located at a position lower than a lower end of the rake surface 17. A force corresponding to a cutting resistance is applied from the workpiece 201 to the upper cutting edge 9 during the cutting process. On this occasion, the land surface 15 and the rake surface 17 are susceptible to a relatively large force. Owing to the configuration that the lower end of the first inclined surface 35 on the side surface 7 is located at the position lower than the lower end of the rake surface 17, it is possible to ensure a thickness in a direction perpendicular to the virtual straight line X between the side surface 7 and both the land surface 15 and the rake surface 17 in the region in which the first inclined surface 35 and the rake surface 17 are disposed. Accordingly, it is ensured to further enhance the durability of the cutting insert 1.

The cutting insert 1 of the present embodiment also includes the lower cutting edge 11 located along the intersection of the lower surface 5 and the side surface 7. In order that the cutting insert 1 having satisfactory cutting performance and satisfactory durability is also achievable even when using the lower cutting edge 11, the side surface 7 includes a second inclined surface 39 and a second parallel surface 41. The second inclined surface 39 is a portion of the side surface 7 which is connected to the second major cutting edge 29 and is inclined further outward with respect to the virtual straight line X as going from the lower surface 5 to the upper surface 3. The second parallel surface 41 is a portion of the side surface 7 which is continuous with the second minor cutting edge 31 and is parallel to the virtual straight line X. In the cutting insert 1 of the present embodiment, the first parallel surface 37 and the second parallel surface 41 are flush with each other.

Moreover, in the cutting insert 1 of the present embodiment, the upper cutting edge 9 and the lower cutting edge 11 are vertically overlapped with each other. When the upper cutting edge 9 and the lower cutting edge 11 are not vertically overlapped with each other, the first parallel surface 37 and the second parallel 41 are not flush with each other on the side surface 7. Accordingly, the width of the first inclined surface 35 in the direction parallel to the virtual straight line X and the width of the second inclined surface 39 in the direction parallel to the virtual straight line X are different from each other.

That is, at least one of the first inclined surface 35 and the second inclined surface 39 includes a region in which the width of the first inclined surface 35 in the direction parallel to the virtual straight line X is partially decreased. On this occasion, variations in the strength of the upper cutting edge 9 or the lower cutting edge 11 are apt to occur as described above. However, the vertically overlapping arrangement of the upper cutting edge 9 and the lower cutting edge 11 minimizes the possibility of causing the variations in the strength of the upper cutting edge 9 and the lower cutting edge 11.

Figure 6:
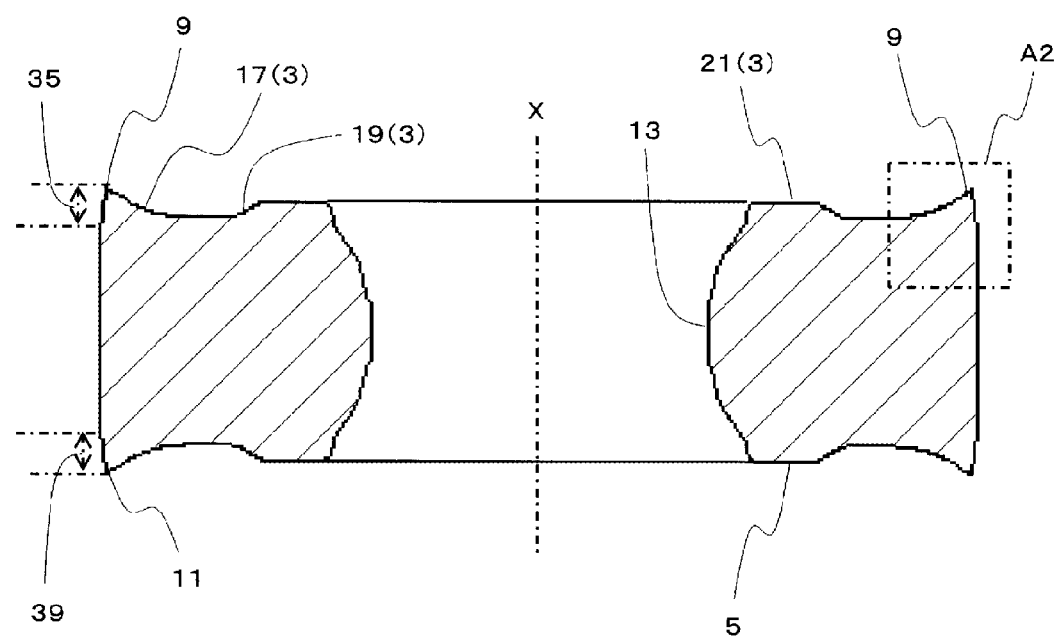
FIG. 6 is a cross-sectional view taken along the line D2-D2 in the cutting insert shown in FIG. 2.
Figure 7:
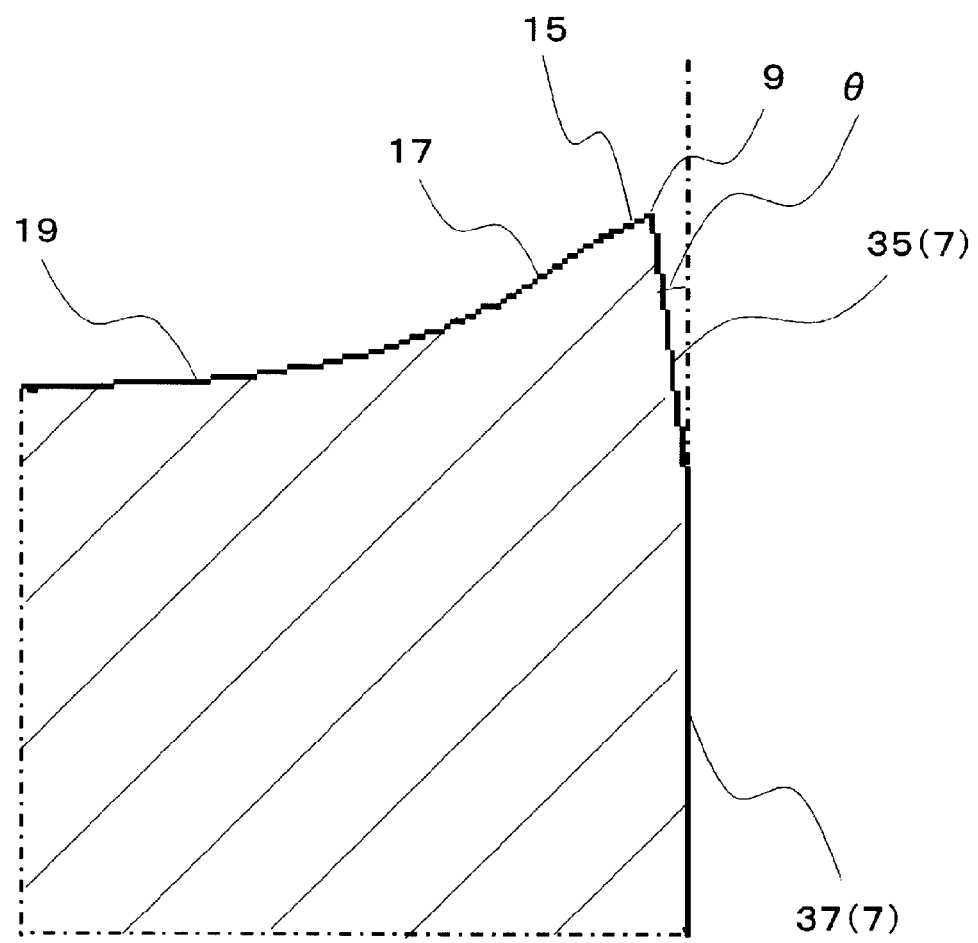
FIG. 7 is an enlarged cross-sectional view showing in enlarged dimension a region A2 in the cutting insert shown in FIG. 6.
Figure 8:
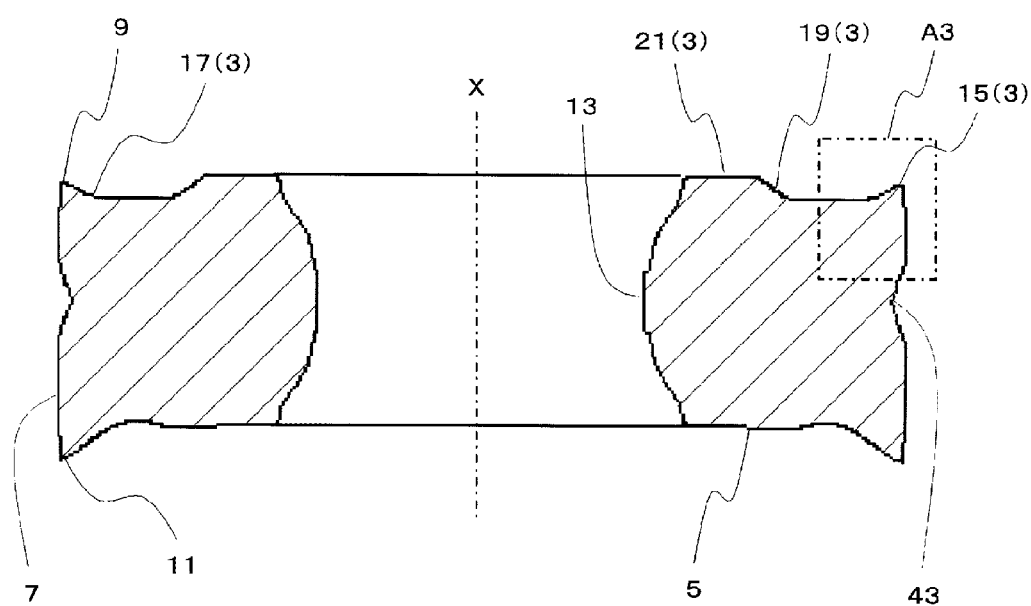
FIG. 8 is a cross-sectional view taken along the line D3-D3 in the cutting insert shown in FIG. 2.
Figure 9:
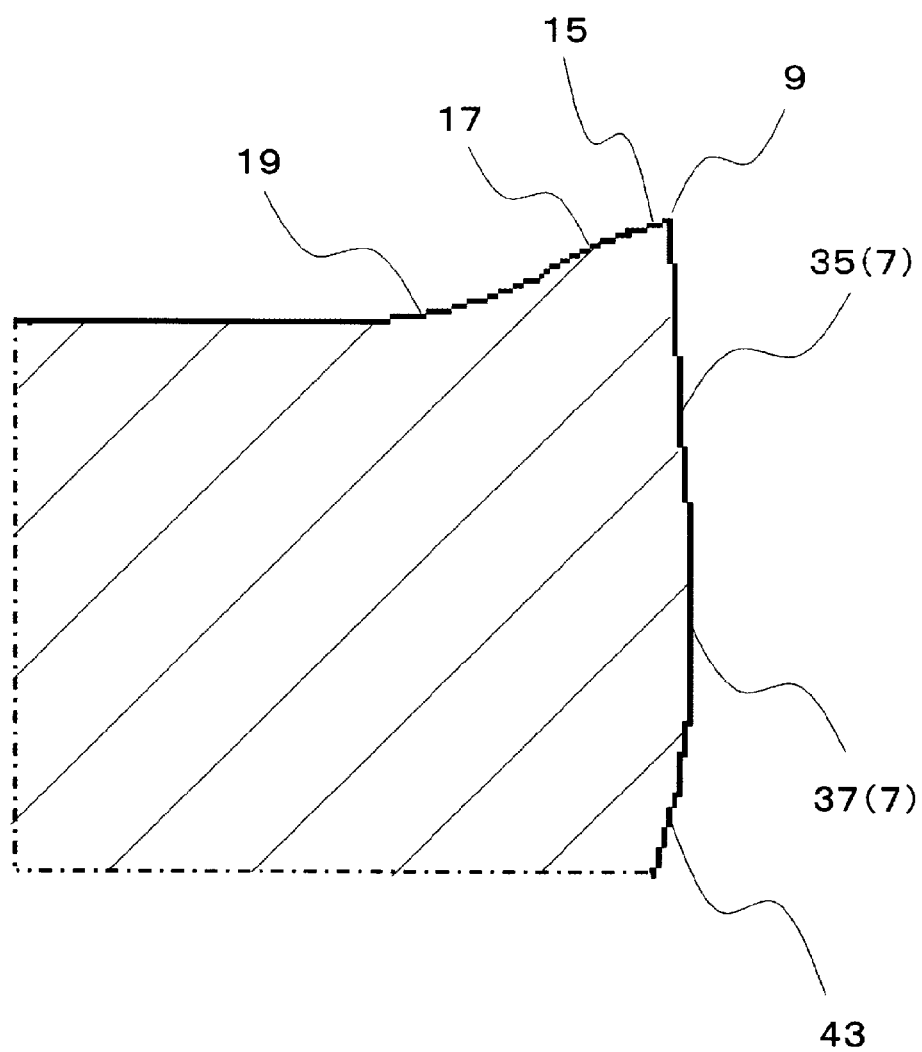
FIG. 9 is an enlarged cross-sectional view showing in enlarged dimension a region A3 in the cutting insert shown in FIG. 8.

In the cutting insert 1 of the present embodiment, the inclination angle of the second inclined surface 39 with respect to the virtual straight line X is the same as the inclination angle of the first inclined surface 35 with respect to the virtual straight line X in a cross section including the virtual straight line X and the center of the first major cutting edge 23. As shown in FIG. 6, the width of the second inclined surface 39 in the direction parallel to the virtual straight line X is the same as the width of the first inclined surface 35 in the direction parallel to the virtual straight line X in the cross section including the virtual straight line X and the center of the first major cutting edge 23. These configurations are aimed at reducing the possibility of causing the variations in the strength of the upper cutting edge 9 and the lower cutting edge 11.

As described earlier, the cutting insert 1 of the present embodiment includes, between the land surface 15 and the breaker surface 19, the major surface 21, the rake surface 17 having the inclined surface shape whose height decreases as going to the center. A width W1 of the rake surface 17 indicated by the distance between the outer periphery and inner periphery of the rake surface 17 increases as going from a portion of the rake surface 17 which is continuous with an end portion of the first major cutting edge 23 to a portion of the rake surface 17 which is continuous with the center of the first major cutting edge 23 in the top plan view.

The portion being continuous with the end portion of the first major cutting edge 23 denotes an intersection point of a straight line connecting the center of the upper surface 3 and the end portion of the first major cutting edge 23, and the outer periphery of the rake surface 17 in the top plan view. The portion being continuous with the center of the first major cutting edge 23 denotes an intersection point of a straight line connecting the center of the upper surface 3 and the center of the first major cutting edge 23, and the outer periphery of the rake surface 17 in the top plan view.

Additionally, in the cutting insert 1 of the present embodiment, a width W2 of the breaker surface 19, which is located inward of the rake surface 17 and is in the shape of the inclined surface whose height increases as going to the center, increases as going from the portion being continuous with the end portion of the first major cutting edge 23 to the portion being continuous with the center of the first major cutting edge 23.

The width of the breaker surface 19 denotes a distance between two intersection points between a straight line passing through the center of the upper surface 3 and the outer periphery thereof, and the breaker surface 19, specifically, the distance between the intersection point close to the outer periphery and the intersection point close to the center in the top plan view. The portion being continuous with the end portion of the first major cutting edge 23 denotes an intersection point of a straight line connecting the center of the upper surface 3 and the end portion of the first major cutting edge 23, and the breaker surface 19. The portion being continuous with the center of the first major cutting edge 23 denotes an intersection point of a straight line connecting the center of the upper surface 3 and the center of the first major cutting edge 23, and the breaker surface 19.

A full width of a concave surface made up of the rake surface 17 and the breaker surface 19 increases as going from the portion being continuous with the end portion of the first major cutting edge 23 to the portion being continuous with the center of the first major cutting edge 23.

As described above, the first major cutting edge 23 has the projecting curvilinear shape. The thickness R2 of the chips generated at the center of the first major cutting edge 23 is larger than the thickness R1 of the chips generated at the end portion of the first major cutting edge 23 close to the first minor cutting edge. Therefore, the chips generated at the center of the first major cutting edge 23 is less likely to be curled than the chips generated at the end portion of the first major cutting edge 23 close to the first minor cutting edge.

However, when the rake surface 17 and the breaker surface 19 are respectively configured as described above, the rake surface 17 and the breaker surface 19 respectively have a relatively large width in a region through which the chips with a relatively large thickness flow. Hence, it is ensured to stably curl the chips without increasing the entirety of the concave surface made up of the rake surface 17 and the breaker surface 19.

In the cutting insert 1 of the present embodiment, a height of the lower end of each of the rake surface 17 and the breaker surface 19 at the portion being continuous with the center of the first major cutting edge 23, namely, a height of a bottom portion of the concave surface is lower than a height of a bottom portion of the concave surface at the portion being continuous with the end portion of the first major cutting edge 23. In other words, a depth of the concave surface at the portion being continuous with the center of the first major cutting edge 23 is larger than a depth of the concave surface at the portion being continuous with the end portion of the first major cutting edge 23.

Therefore, the chips with the relatively large thickness, which are generated at the center of the first major cutting edge 23 and flow to the portion of the concave surface which is continuous with the center of the first major cutting edge 23, can be stably guided to the concave surface so as to be curled.

The side surface 7 includes a plurality of third recessed portions 43. The third recessed portions 43 serves as a constraining surface with respect to the holder 103 when the cutting insert 1 is used by attaching it to the holder 103. That is, the side surface 7 includes the plurality of concave-shaped constraining surfaces.

In the cutting insert 1 of the present embodiment, each of these constraining surfaces is at least partially located below a bottom portion of the first recessed portion 27. That is, each of the plurality of third recessed portions 43 is at least partially located below the bottom portion of the first recessed portion 27. The plurality of third recessed portions 43 are recessed further toward the center of the upper surface 3 than the upper cutting edge 9 in a perspective plan view. Thus, the plurality of third recessed portions 43 as the constraining surface with respect to the holder 103 are respectively not only disposed on the side surface 7 but also located below the bottom portions of the first recessed portions 27.

When the cutting process of the workpiece 201 is performed using the upper cutting edge 9, because the upper cutting edge 9 includes the first recessed portion 27, the bottom portion of the first recessed portion 27 in the upper cutting edge 9 is easily subjected to a relatively large cutting resistance. Consequently, stress concentration may occur in the vicinity of the bottom portion, thus leading to crack. However, the foregoing third recessed portion 43 is included so as to stop the propagation of the crack by the third recessed portion 43.

To be specific, even upon occurrence of a crack that propagates from the bottom portion of the first recessed portion 27 of the upper cutting edge 9 toward the lower surface 5 through the inside of the cutting insert 1, the crack is to be exposed on the surface of the third recessed portion 43. This ensures that the influence of the crack is limited to a partial fracture from the upper surface 3 to the third recessed portion 43. In other words, a force by which the crack propagates can be released to the outside through the third recessed portion 43 so as to reduce the possibility that the crack reaches the lower surface 5.

The plurality of third recessed portions 43 are recessed further toward the center of the lower surface 5 than the lower cutting edge 11, and each of the plurality of third recessed portions 43 is at least partially located above the bottom portion of each of the plurality of second recessed portions 33 in a perspective plan view.

Hence, even upon occurrence of a crack that propagates from the bottom portion of the second recessed portion 33 of the lower cutting edge 11 toward the upper surface 3 through the inside of the cutting insert 1 when the lower cutting edge 11 is used as the cutting edge, the crack is to be exposed on the surface of the third recessed portion 43. This ensures that the influence of the crack is limited to a partial fracture from the lower surface 5 to the third recessed portion 43. In other words, the force by which the crack propagates can be released to the outside through the third recessed portion 43 so as to reduce the possibility that the crack reaches the upper surface 3.

<Cutting Tool>

A cutting tool 101 according to an embodiment of the present invention is described below with reference to the drawings.

Figure 11:
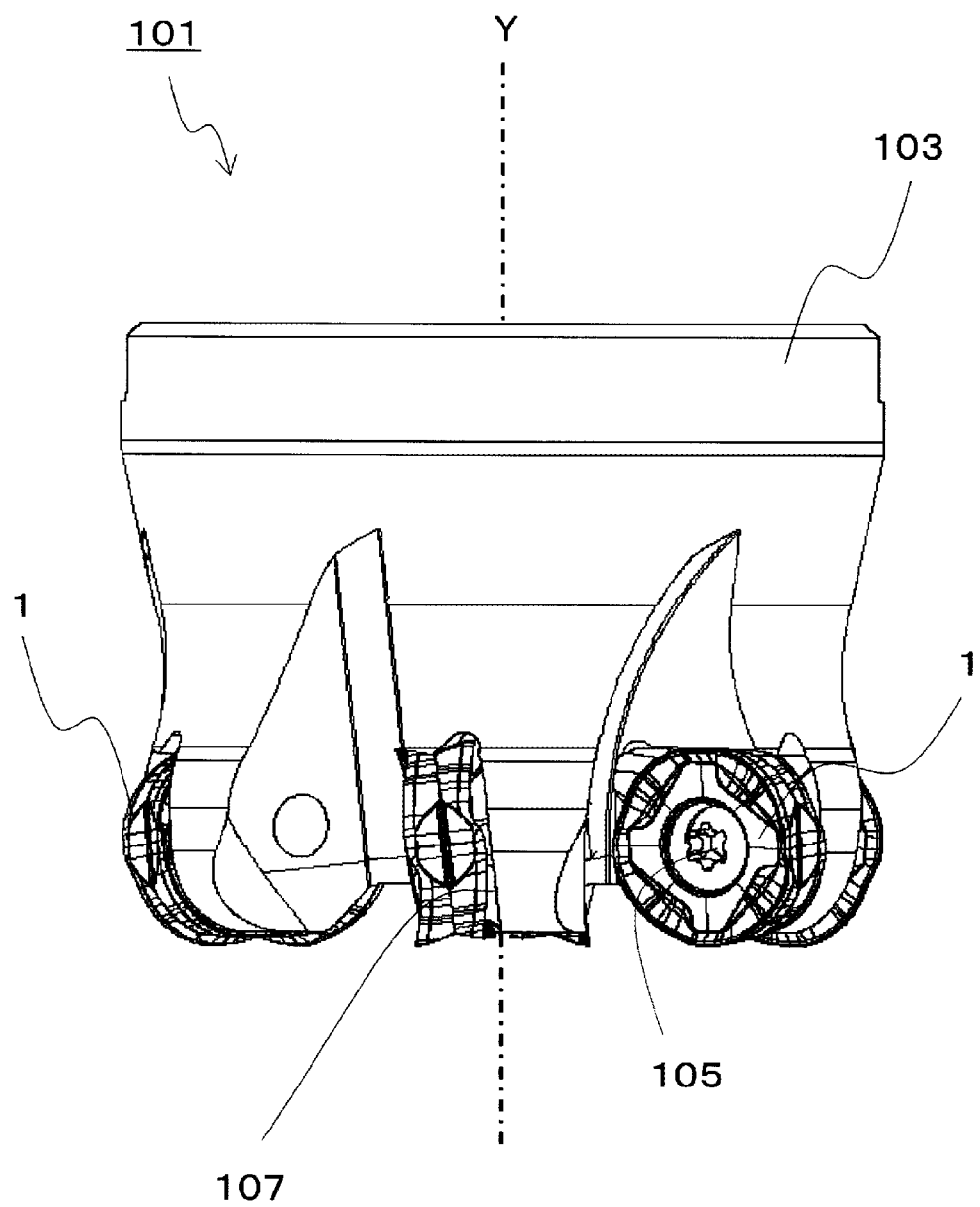
FIG. 11 is a side view of the cutting tool shown in FIG. 10.

As shown in FIGS. 10 and 11, the cutting tool 101 of the present embodiment includes a holder 103 having a rotation center axis Y, and a plurality of cutting inserts 1 as described above. The holder 103 has a plurality of insert pockets 107 on an outer circumferential surface close to a front end of the holder 103. The plurality of cutting inserts 1 are respectively attached to the insert pockets 107.

The holder 103 has an approximately rotary body shape around the rotation center axis Y. The plurality of insert pockets 107 are disposed at equal intervals on the outer peripheral surface close to the front end of the holder 103. The insert pockets 107 are portions respectively configured to attach the cutting inserts 1 thereto and open to the outer peripheral surface and a front end surface of the holder 103. Specifically, each of the insert pockets 107 includes a seating surface opposed to a rotation direction, and a plurality of constraining side surfaces that are located in an intersecting direction of the seating surface and are inclined in a direction to approach a perpendicular line of the seating surface as going away from the seating surface.

The plurality of cutting inserts 1 are respectively attached to the plurality of insert pockets 107 disposed on the holder 103. The plurality of cutting inserts 1 are attached so that the upper cutting edge 9 projects from the outer circumferential surface thereof in an outward direction, namely, sidewardly of the holder 103. Specifically, the plurality of cutting inserts 1 are attached to the holder 103 so that a circular arc shaped curvilinear portion of the upper cutting edge 9 projects from the outer circumferential surface of the holder 103. This ensures that the curvilinear portion of the upper cutting edge 9 is constrained at the most projected position from the outer circumferential surface of the holder 103 during the cutting process, thereby satisfactorily producing the effect of the cutting inserts 1 of the present embodiment.

When each of the cutting inserts 1 includes not only the upper cutting edge 9 but also the lower cutting edge 11, the cutting insert 1 may be attached to the insert pocket 107 by turning the cutting insert 1 upside down so that the lower cutting edge 11 projects from the outer circumferential surface thereof toward the side of the holder 103.

At least one of the plurality of third recessed portions 43 is contacted with the holder 103. Therefore, the third recessed portion 43 in contact with the holder 103 functions as the constraining surface of the cutting insert 1 with respect to the holder 103. Here, a bottom portion of the third recessed portion 43 is preferably in non-full contact with the holder 103. When the bottom portion of the third recessed portion 43 is contacted with the holder 103, a force is applied from the holder 103 to the bottom portion of the third concave portion 43, and consequently a crack can occur from the bottom portion of the third recessed portion 43. When the bottom portion of the third recessed portion 43 is spaced apart from the holder 103, it is possible to prevent the force from being applied to the bottom portion of the third recessed portion 43. This minimizes the possibility that the crack occurs from the third recessed portion 43.

According to the present embodiment, each of the cutting inserts 1 is attached to the insert pocket 107 by a screw 105. That is, the cutting insert 1 is attachable to the holder 103 by inserting the screw 105 into the through hole 13 of the cutting insert 1, and by inserting the front end of the screw 105 into a screw hole (not shown) disposed in the insert pocket 107 so as to screw together screw portions.

According to the present embodiment, the cutting insert 1 is attached to the holder 103 so that the upper cutting edge 9 projecting outward from the outer circumferential surface thereof has a negative axial rake angle and a negative radial rake angle.

Steel, cast iron, or the like is usable for the holder 103. Among others, high-rigidity steel is preferably used.

<Method of Producing Machined Product>

A method of producing a machined product according to an embodiment of the present invention is described below with reference to the drawings.

The machined product is produced by subjecting a workpiece 201 to a cutting process. The method of producing the machined product according to the present embodiment includes the following steps (1) to (3):

(1) the step of rotating the cutting tool 101 as represented by the foregoing embodiment;

(2) the step of bringing the upper cutting edge 9 or the lower cutting edge 11 of the cutting tool 101 being rotated into contact with the workpiece 201; and (3) the step of separating the cutting tool 101 from the workpiece 201.

Figure 12:
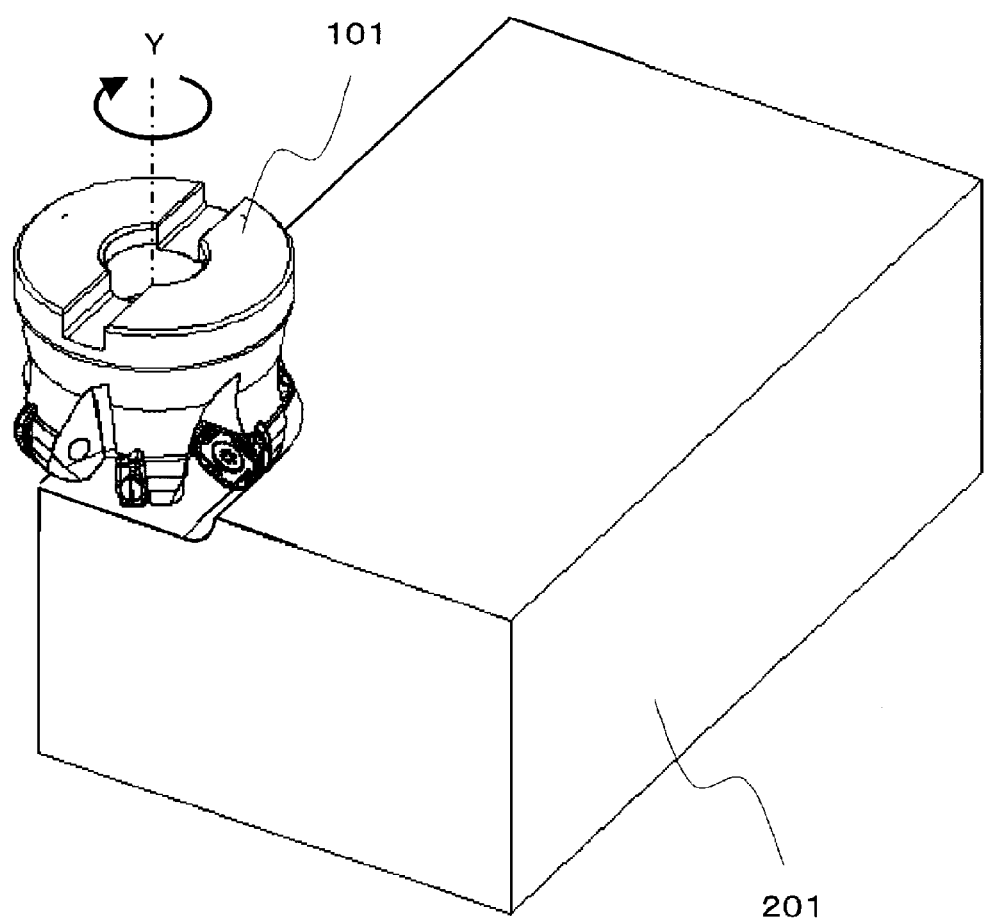
FIG. 12 is a perspective view showing one step of a method of producing a machined product according to an embodiment of the present invention.
Figure 13:
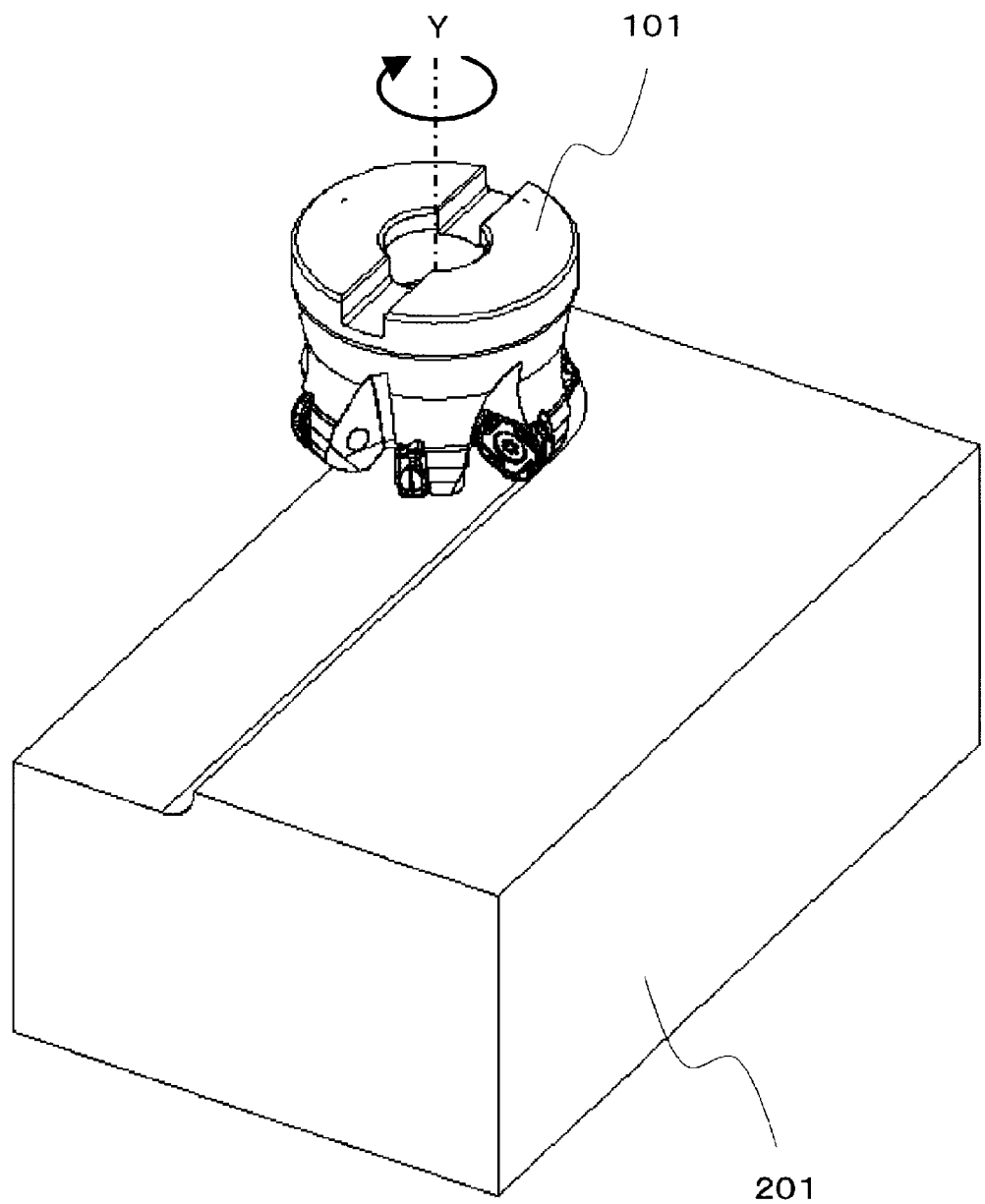
FIG. 13 is a perspective view showing another step of the method of producing the machined product according to the embodiment of the present invention.

More specifically, firstly, the cutting tool 101 is relatively brought near the workpiece 201 while rotating the cutting tool 101. Subsequently, the upper cutting edge 9 of the cutting tool 101 is brought into contact with the workpiece 201 so as to cut the workpiece 201 as shown in FIGS. 12 and 13. Thereafter, the cutting tool 101 is kept relatively away from the workpiece 201 as shown in FIG. 15.

Figure 14:
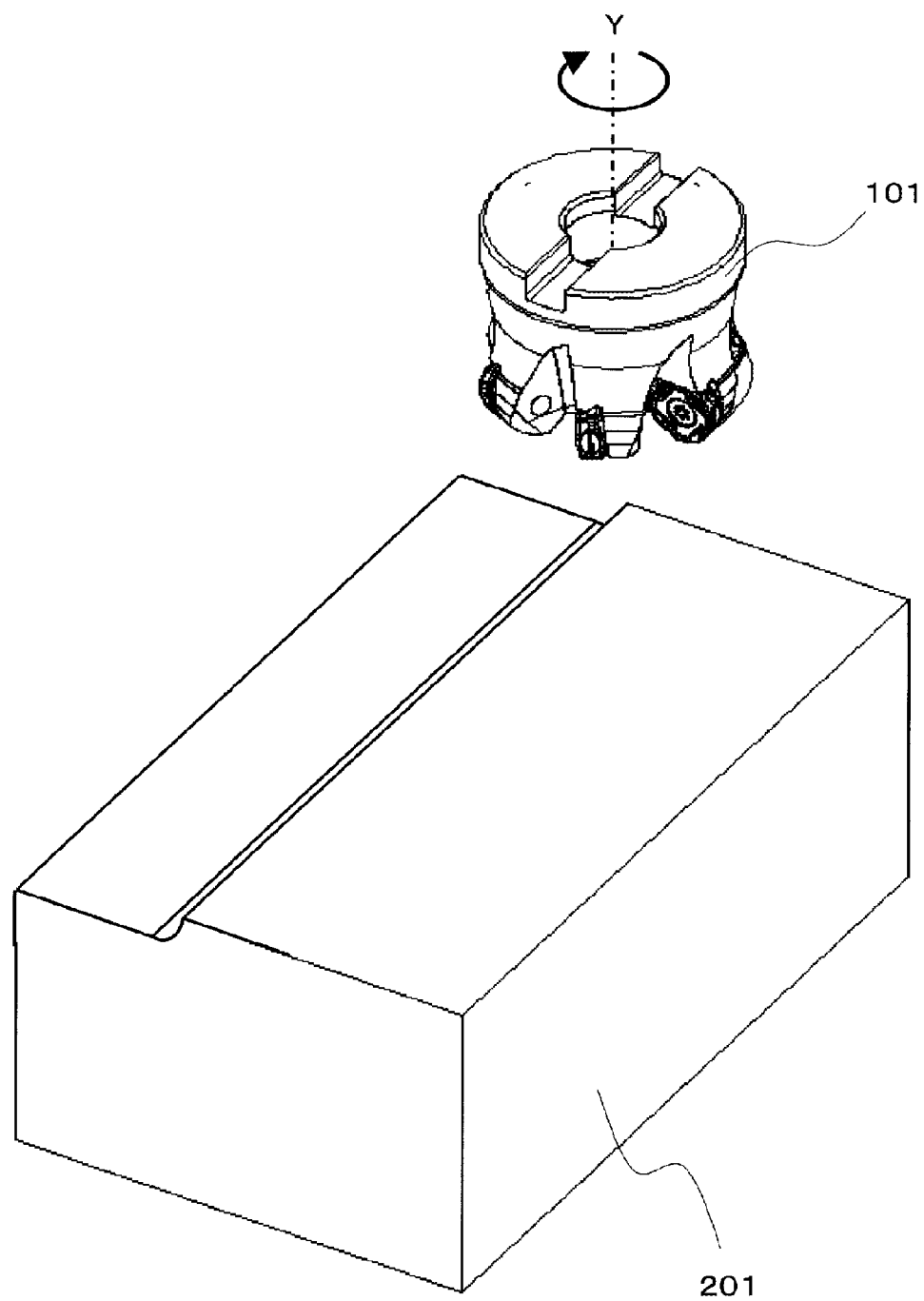
FIG. 14 is a perspective view showing still another step of the method of producing the machined product according to the embodiment of the present invention.

In the present embodiment, the workpiece 201 is fixed and the cutting tool 201 is brought near the workpiece 201. In FIGS. 12 and 13, the workpiece 201 is fixed and the cutting tool 101 is rotated. In FIG. 14, the workpiece 201 is fixed and the cutting tool 201 is separated from the workpiece 201. The workpiece 201 is fixed and the cutting tool 101 is moved in each of the steps in the cutting process according to the producing method of the present embodiment. This embodiment is illustrated by way of example and without limitation.

For example, in the step (1), the workpiece 201 may be brought near the cutting tool 101. In the step (3), the workpiece 201 may be separated from the cutting tool 101. When the cutting process is continued, it is required to repeat the step of bringing the upper cutting edge 9 or the lower cutting edge 11 of the cutting insert 1 into contact with different portions of the workpiece 201, while holding the rotation of the cutting tool 101. When the upper cutting edge 9 or the lower cutting edge 11 in use is worn, another upper cutting edge 9 or another lower cutting edge 11 not yet used may be used by rotating the cutting insert 1 through 90 degrees with respect to the central axis (virtual straight line X) of the through hole 13.

Representative examples of the material of the workpiece 201 include carbon steel, alloy steel, stainless steel, cast iron, and nonferrous metals.

DESCRIPTION OF THE REFERENCE NUMERAL

1: Cutting insert
3: Upper surface
5: Lower surface
7: Side surface
9: Upper cutting edge
11: Lower cutting edge
13: Through hole
15: Land surface
17: Rake surface
19: Breaker surface
21: Major surface
23: First major cutting edge
25: First minor cutting edge
27: First recessed portion
29: Second major cutting edge
31: Second minor cutting edge
33: Second recessed portion
35: First inclined surface
37: First parallel surface
39: Second inclined surface
41: Second parallel surface
43: Third recessed portion
101: Cutting tool
103: Holder
105: Screw
107: Insert pocket
201: Workpiece

The invention claimed is:

1. A cutting insert, comprising:
a lower surface;
an upper surface;
a side surface connected to each of the lower surface and the upper surface; and
an upper cutting edge located along an intersection of the upper surface and the side surface,
wherein the upper cutting edge comprises a first major cutting edge having an outwardly projecting curvilinear shape, and a first minor cutting edge having a straight line shape and being continuous with the first major cutting edge,
wherein the side surface comprises a first inclined surface that is continuous with the first major cutting edge and is inclined further outward as going from the upper surface to the lower surface with respect to a virtual straight line connecting a center of the upper surface and a center of the lower surface, and a first parallel surface that is continuous with the first minor cutting edge and is parallel to the virtual straight line, and
wherein an inclination angle of the first inclined surface with respect to the virtual straight line on the side surface increases as going from a portion of the first inclined surface which is continuous with an end portion of the first major cutting edge to a portion of the first inclined surface which is continuous with a center of the first major cutting edge.

2. The cutting insert according to claim 1, wherein a width of the first inclined surface on the side surface in a direction parallel to the virtual straight line is constant.

3. The cutting insert according to claim 1,
wherein the upper surface comprises a land surface located on an outer circumferential edge of the upper surface so as to be connected to the upper cutting edge, and a rake surface surrounded by the land surface and having a smaller height as going toward the center of the upper surface, and
wherein a lower end of the first inclined surface on the side surface is at a position lower than a lower end of the rake surface.

4. The cutting insert according to claim 3, wherein in a distance between an outer periphery and an inner periphery of the rake surface increases as going from a portion of the rake surface corresponding to the end portion of the first major cutting edge to a portion of the rake surface corresponding to the center of the first major cutting edge in a top plan view.

5. The cutting insert according to claim 3,
wherein the upper surface comprises a breaker surface being surrounded by the rake surface and having a larger height as going toward the center of the upper surface, and
wherein a distance between an outer periphery and an inner periphery of the breaker surface increases as going from a portion of the breaker surface corresponding to the end portion of the first major cutting edge to a portion of the breaker surface corresponding to the center of the first major cutting edge in a top plan view.

6. The cutting insert according to claim 1, further comprising a lower cutting edge located along an intersection of the lower surface and the side surface,
wherein the lower cutting edge comprises a second major cutting edge having an outwardly projecting curvilinear shape, and a second minor cutting edge having a straight line shape and being continuous with the second major cutting edge,
wherein the side surface comprises a second inclined surface that is continuous with the second major cutting edge and is inclined further outward as going from the lower surface to the upper surface with respect to the virtual straight line, and a second parallel surface that is continuous with the second minor cutting edge and is parallel to the virtual straight line.

7. The cutting insert according to claim 6, wherein the upper cutting edge and the lower cutting edge are vertically overlapped with each other.

8. The cutting insert according to claim 7, wherein an inclination angle of the second inclined surface with respect to the virtual straight line is identical with the inclination angle of the first inclined surface with respect to the virtual straight line in a cross section including the virtual straight line and the center of the first major cutting edge.

9. The cutting insert according to claim 7, wherein a width of the second inclined surface in a direction parallel to the virtual straight line is identical with a width of the first inclined surface in a direction parallel to the virtual straight line in a cross section including the virtual straight line and the center of the first major cutting edge.

10. A cutting tool, comprising:
a holder having a plurality of insert pockets on a front end of the holder; and
a cutting insert according to claim 1 configured to be attached to each of the insert pockets so that the upper cutting edge projects sidewardly of the holder.

11. A method of producing a machined product, comprising:
- rotating a cutting tool according to claim 10;
- bringing the upper cutting edge of the cutting tool being rotated into contact with a workpiece; and
- separating the cutting tool from the workpiece.

12. A cutting tool, comprising:
- a holder having a plurality of insert pockets on a front end of the holder; and
- a cutting insert according to claim 6 configured to be attached to each of the insert pockets so that the upper cutting edge or the lower cutting edge projects sidewardly of the holder.

13. A method of producing a machined product, comprising:
- rotating a cutting tool according to claim 12;
- bringing the upper cutting edge or the lower cutting edge of the cutting tool being rotated into contact with a workpiece; and
- separating the cutting tool from the workpiece.

* * * * *